US006604100B1

(12) United States Patent
Fernandez et al.

(10) Patent No.: US 6,604,100 B1
(45) Date of Patent: Aug. 5, 2003

(54) METHOD FOR CONVERTING RELATIONAL DATA INTO A STRUCTURED DOCUMENT

(75) Inventors: Maria F. Fernandez, Madison, NJ (US); Dan Suciu, Seattle, WA (US); Wang-Chiew Tan, Philadelphia, PA (US)

(73) Assignee: AT&T Corp., New York, NY (US)

( * ) Notice: Subject to any disclaimer, the term of this patent is extended or adjusted under 35 U.S.C. 154(b) by 212 days.

(21) Appl. No.: 09/778,749

(22) Filed: Feb. 8, 2001

Related U.S. Application Data
(60) Provisional application No. 60/181,400, filed on Feb. 9, 2000.

(51) Int. Cl.[7] .............................................. G06F 17/30
(52) U.S. Cl. ................................ 707/3; 707/513; 707/1
(58) Field of Search ............................... 707/1, 2, 3, 4, 707/10, 104.1, 513

(56) References Cited

U.S. PATENT DOCUMENTS 6,263,332 B1 * 7/2001 Nasr et al. ................... 707/513
6,343,287 B1 * 1/2002 Kumar et al. .................. 707/4
6,366,934 B1 * 4/2002 Cheng et al. ................ 707/513

OTHER PUBLICATIONS

Jayavel Shanmugasundaram, H. Gang, Kristin Tufte, Chun Zhang, David DeWitt, and Jeffrey F. Naughton. Relational Databases for Querying XML Documents: Limitations and Opportunities. In Proceedings of the Conference on Very Large Data Bases, 1999.*

A. Deutsch, M. F. Fernandez, and D. Suciu. Storing semi-structured data with STORED. In SIGMOD '99, pp. 431–442, 1999.*
Geo Wiederhold, "Mediators in the Architecture of Future Information System," IEEE Computer, Mar. 1992, pp. 38–49.
Mary Fernandez et al., "Efficient Evaluation of XML Middle-ware Queries" Nov. 27, 2000.
Mary Fernandez et al., "SilkRoute: Trading between Relation and XML", Jun. 16, 2000.
I. Manolescu, D. Florescu, D. Kossmann, F. Xhumari, D. Olteanu, "Agora: Living with XML and Relational", in VLDB 2000, pp 623–626.
J. Shanmugasundaram, J. Kiernan, E. Shekita, C. Fan, J. Funderburk, "Querying XML views of relational data", in VLDB 2001.
J. Shanmugasundaram, E. Shekita, R. Barr, M. Carey, B. Lindsay, H. Pirahesh, B. Reinwald, "Efficiently Publishing Relational Data as XML Documents", VLDB Journal (to appear).

* cited by examiner

Primary Examiner—Diane D. Mizrahi
Assistant Examiner—Yicun Wu

(57) ABSTRACT

A method for converting relational data to XML (Extensible Markup Language) is provided. The method, sometimes referred to as SilkRoute, provides a general, dynamic and efficient tool for viewing and querying relational data in XML. SilkRoute can express mappings of relational data in XML that conforms to arbitrary public document type definitions. Also, SilkRoute can materialize the fragment of an XML view needed by an application and it can fully exploit the query engine of a relational database management system whenever data items in an XML view need to be materialized.

49 Claims, 2 Drawing Sheets

METHOD FOR CONVERTING RELATIONAL DATA INTO A STRUCTURED DOCUMENT

CROSS-REFERENCE TO RELATED APPLICATIONS

This application claims priority under 35 USC § 119(e) to U.S. provisional patent application serial No. 60/181,400, filed on Feb. 9, 2000.

FIELD OF THE INVENTION

The present invention relates to the field of data exchange between applications on the Internet. More particularly, the present invention relates to converting relational data into XML (eXtensible Markup Language).

BACKGROUND OF THE INVENTION

XML (eXtensible Markup Language) can serve many purposes. XML is a more expressive markup language than HTML (Hyper-Text Markup Language). XML may be an object-serialization format for distributed object applications. XML serves as the standard format for data exchange between inter-enterprise applications on the Internet. In data exchange, XML documents are generated from persistent data and then sent over a network to an application. To facilitate data exchange, numerous industry groups, such as healthcare and telecommunications groups, have been defining public document type definitions (DTDs) that specify the format of the XML data to be exchanged between their applications. The aim is to use XML as a "lingua franca" for data exchange between inter-enterprise applications. XML could make it possible for data to be exchanged regardless of the platform on which it is stored or the data model in which it is represented.

Most data is stored in relational or object-relational database management systems (RDBMS) or in legacy formats. To realize the full potential of XML, tools are needed that can automatically convert the vast stores of relational data into XML. Such tools should be general, dynamic, and efficient.

Relational data is tabular, flat, normalized, and its schema is proprietary, which makes it unsuitable for direct exchange. In contrast, XML data is nested and un-normalized, and its DTD is public. Thus, the mapping from relational data to an XML view is often complex, and a conversion tool must be general enough to express complex mappings. Existing commercial systems fail to be general, because they map each relational database schema into a fixed, canonical DTD. This approach is limited, because no public DTD will match exactly a proprietary relational schema. In addition, it is often desirable to map one relational source into multiple XML documents, each of which conforms to a different DTD. Hence a second step is required to transform the data from its canonical form in XML into its final XML form.

Also, the tools must be dynamic, i.e., only the fragment of the XML document needed by the application should be materialized. In database terminology, the XML view must be virtual. The application typically specifies in a query what data item(s) it needs from the XML document. Typically, these items are a small fraction of the entire data. Some commercial products allow users to export relational data into XML by writing scripts. However, these tools are not dynamic. Rather, they are general because the entire document is generated all at once.

Finally, to be efficient, such tools must exploit fully the underlying query engine of RDBMS whenever data items in the XML view need to be materialized. Query processors for ative XML data are still immature and do not have the performance of highly optimized DBMS engines.

Several commercial tools for exporting relational data into XML views exist today. The ODBC2XML, a product of Intelligent Systems Research (www.intsysr.com) tool allows users to define XML documents with embedded SQL statements, which permit the users to construct an XML view of the relational data. Such views are materialized, however, and cannot be further queried with an XML query language. Alternatively, Oracle's XSQL tool defines a fixed, canonical mapping of the relational data into an XML document, by mapping each relation and attribute name to an XML tag and tuples as nested elements. Such a view could be kept virtual, but this approach is not general enough to support mapping into an arbitrary XML format. IBM's DB2, XML Extender provides a Data Access Definition (DAD) language that supports both composition of relational data in XML and decomposition of XML data into relational tables. DAD's composition feature supports generation of arbitrary XML from relational data. However, the criteria for grouping elements is implicit in the DAD and DAD specifications cannot be nested arbitrarily. More significantly, XML Extender does not support query composition.

SUMMARY OF THE INVENTION

The present invention overcomes many of the shortcomings of the prior art. In addition, the present invention addresses the problem of automating the conversion of relational data into XML. According to the invention, a general, dynamic, and efficient tool for viewing and querying relational data in XML referred to as SilkRoute is provided. SilkRoute is general, because it can express mappings of relational data into XML that conform to arbitrary DTDs, not just a canonical mapping of the relational schema. The mappings may be referred to as views. Applications can express the data they need as an XML-QL query over the view. SilkRoute is dynamic, because it can materialize the fragment of an XML view needed by an application, and Silkroute is efficient, because it can fully exploit the underlying RDBMS (Relational DataBase Management Systems) query engine whenever data items in an XML view need to be materialized.

According to one aspect of the present invention a general framework is provided for mapping relational databases to XML views, to be used in data exchange. In another aspect of the invention, a new query language, RXL, for mapping relational sources to XML views, is provided. According to yet another aspect, the present invention provides a sound and complete query composition algorithm that, when given an RXL query and an XML-QL query, generates a new RXL query equivalent to their composition. In a still further aspect of the present invention, a technique is provided in which most of the work of an RXL query can be shipped to the underlying database engine.

Although the invention has been defined using the appended claims, these claims are exemplary and limiting to the extent that the invention is meant to include one or more elements from the apparatuses described herein in any combination or sub-combination. Accordingly, there are any number of alternative combinations for defining the invention that incorporate one or more elements from the specification (including drawings, claims, etc.) in any combinations or sub-combinations.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION

Figure 1:
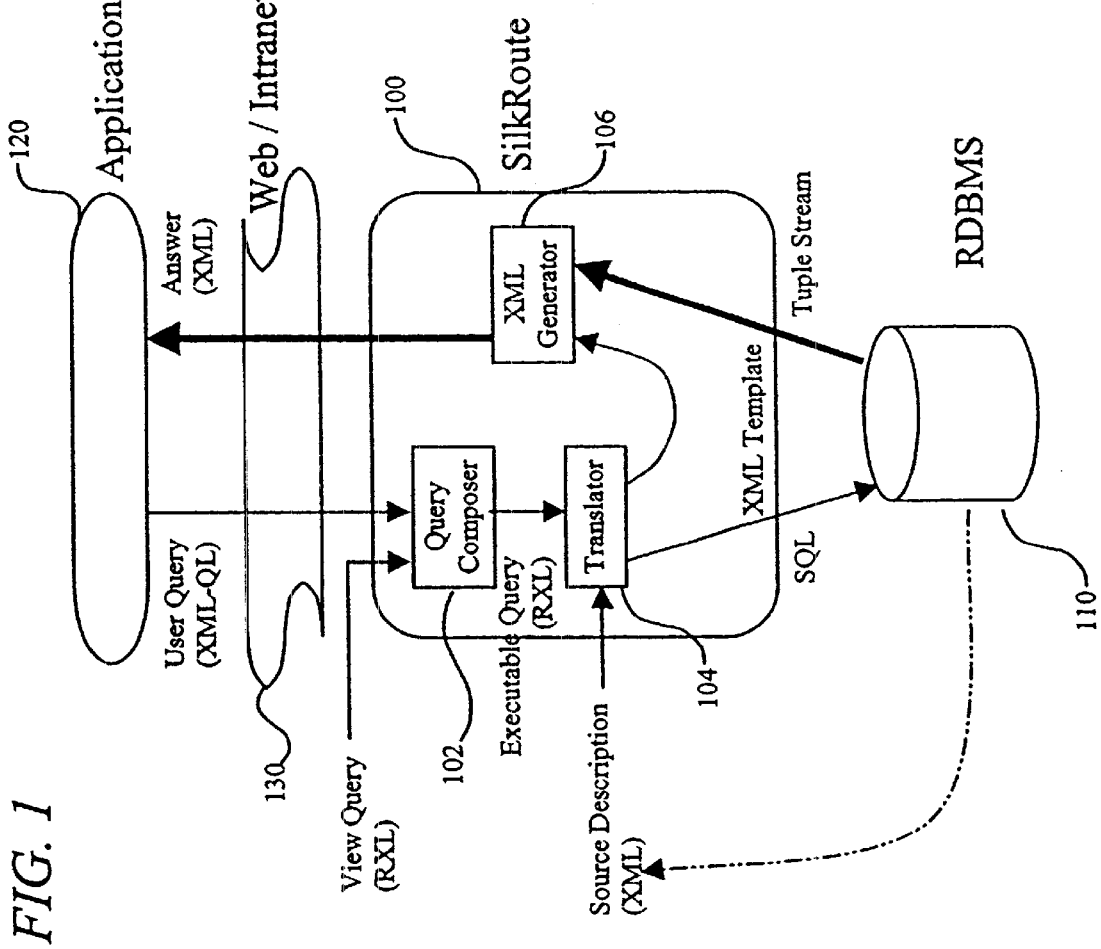
FIG. 1 shows an illustrative architecture of SilkRoute according to the present invention.

The present invention includes SilkRoute, a general, dynamic, and efficient tool for viewing and querying relational data in XML. SilkRoute is a particular instance of a mediator system, as defined by Geo Wiederhold in "Mediators in the Architecture of Future Information Systems" IEEE Computer, pages 38–49, March 1992. In SilkRoute, data can be exported into XML in two steps. First, an XML view of the relational database may be defined using a declarative query language, called RXL (Relational to XML Transformation Language). The resulting XML view can be virtual. Second, some other application formulates a query over the virtual view, extracting some piece of XML data. For this purpose, an existing XML query language, XML-QL, may be used. Only the result of that XML-QL query can be materialized.

The core of SilkRoute is RXL, a powerful, declarative data-transformation language from flat relations to XML data. On the relational side, RXL has much of the power of SQL queries and can express joins, selection conditions, aggregates, and nested queries. On the XML side, RXL has the full power of XML-QL, and can generate XML data with complex structure and with arbitrary levels of nesting. It can also specify arbitrary grouping criteria, using nested queries and Skolem functions. Typical RXL queries are long and complex, because they express general transformations from the relational store to the XML view. RXL has a block structure to help users organize, structure, and maintain large queries.

Once the virtual XML view is defined, SilkRoute accepts XML-QL user queries and composes them automatically with the RXL query. The result of the composition is another RXL query, which can extract that fragment of the relational data that the user requested. In existing relational databases, composition can be straightforward and not considered a problem. For example, Ramakrishnan and Gehrke, in "Database Management Systems" McGraw-Hill, 2nd ed. 1999, describe how to reformulate SQL queries over SQL virtual views as SQL queries over base relations. For XML, however, this problem is more complex. The present invention provides a sound, complete, and conceptually simple algorithm that when given an RXL query and an XML-QL query, produces a new RXL query equivalent to their composition. Some restrictions can be placed on aggregate functions in RXL queries, but they can be used freely in XML-QL queries.

When an RXL query is evaluated, the underlying relational engine does most of the processing. To attain this result, the RXL query can be split into a collection of SQL queries, each of which produces a set of tuples. The SQL queries can be sent to the RDBMS, and their flat, sorted results can be merged in a single pass to construct the nested XML output.

An illustrative implementation of the present invention in electronic commerce, in which suppliers provide product information to resellers, will be described. For their mutual benefit, suppliers and resellers can agree to exchange data in a format that conforms to a particular DTD. An illustrative DTD of XML data exported by suppliers to resellers, supplier.dtd, is shown below.

```
<?xml encoding = "US-ASCII"?>
<!ELEMENT supplier    (company, product*)>
<!ELEMENT product     (name, category, description, retail, sale?,
                       report*)>
<!ATTLIST product     ID ID>
<!ELEMENT company     (#PCDATA)>
<!ELEMENT name        (#PCDATA)>
<!ELEMENT retail      (#PCDATA)>
<!ELEMENT sale        (#PCDATA)>
<!ELEMENT report      (#PCDATA)>
<!ATTLIST report code (size|defective|style) #REQUIRED>
```

The above code includes the supplier's name and a list of available products. Each product element includes an item name, a category name, a brief description, a retail price, an optional sale price, and zero or more trouble reports. The content of a retail or sale element typically is a currency value. A trouble report includes a code attribute, indicating the class of problem; the report's content may be the customer's comments. Most importantly, this DTD can be used by suppliers and resellers, and it can be a public document.

Consider now a particular supplier whose business data is organized according to the relational schema. An illustrative schema of a supplier's relational database (* denotes key) is depicted in the code below.

Clothing(*pid, item, category, description, price, cost)

SalePrice(*pid, price)

Problems(pid, code, comments)

The Clothing table contains tuples with a product id (the table's key), an item name, category name, item description, price, and cost. The SalePrice table contains sale prices and has key field pid and the Problem table contains trouble codes of products and their reports. The above code shows a third-normal form relational schema, designed for the supplier's particular business needs. The schema can be proprietary. For example, the supplier may not want to reveal the attribute cost in Clothing. The supplier's task is to convert its relational data into a valid XML view conforming to the DTD and make the XML view available to resellers. In this example, it is assumed that the supplier exports a subset of its inventory, in particular, its stock of winter outerwear that it wants to sell at a reduced price at the end of the winter season.

Once the XML views of a suppliers' data are available, the reseller can access that data by formulating queries over the XML view. Some examples of such queries may include: 1) retrieve products whose sale price is less than 50% of the retail price; 2) count the number of "defective" reports for a product; and 3) compute minimum and maximum cost of outerwear stock. As these queries might suggest, the reseller is typically interested only in a small subset of the information provided by the suppliers. Those skilled in the art will recognize that these queries could be formulated as SQL queries over the supplier's relational database, but relational schemas can differ from supplier to supplier and may not be accessible by the reseller.

I. Architecture of SilkRoute

FIG. 1 shows an illustrative architecture of SilkRoute according to the present invention. SilkRoute 100, serves as middleware between a relational database server (RDBMS) 110, and an application 120, accessing data over a distributed network, such as the Web/Intranet 130. The distributed network may be a public or private network. According to the invention, the database administrator starts by writing a view query that defines the XML virtual view of the database. In a preferred implementation of the present invention, the view query is an RXL query. The view query is typically complex, because it transforms the relational data into a deeply nested XML view. The resulting view query is virtual, meaning that it is not evaluated, but kept in source code.

Typically, applications contact SilkRoute 100, to request data. An application 120, only "sees" the virtual XML view, not the underlying relational database. To access the data, the application 120, can formulate a user query in XML-QL over the virtual view and send it to SilkRoute 100. Together, the view query (e.g., RXL view query) and the user query (e.g., XML-QL user query) can be passed to the query composer module 102, in SilkRoute 100. The query-composer module 102, computes the composition and produces a new view query (e.g., RXL query), called the executable query. The answer to the executable query typically includes only a small fragment of the database, e.g., one data item, a small set of data items, or an aggregate value. The result of SilkRoute 100, is an XML document, as specified by the user query (e.g., XML-QL user query).

Once computed, the executable query is passed to the translator 104, which partitions the executable query into a data-extraction part, e.g., one or more SQL queries, and an XML-construction part, e.g., an XML template. The translator 104, also may take as an input a description of the relational schema and uses the relational schema to perform syntax checking of the RXL query (e.g., to ensure that the relations named in the RXL query exist in the relational database) and to determine the capabilities of the SQL dialect used by the relational database (e.g., does the SQL dialect support inner joins?).

Until now, SilkRoute 100, has manipulated only query source code, but no data. At this point, the data extraction part (e.g., SQL queries) is sent to the RDBMS server 110, which returns one tuple stream per each query (e.g., SQL query) in the data extraction part. The XML generator module 106, merges the tuple streams with the XML-construction part and produces the XML document, which is then returned to the application 120.

This scenario is probably the most common use of Silk-Route. However those skilled in the art will recognize that minor changes to the information flow in FIG. 1 can permit other scenarios. For example, the data administrator may export the entire database as one large XML document by materializing the view query. This can be done by passing the view query directly to the translator. In another scenario, the result of query composition could be kept virtual for later composition with other user queries. This is useful, for example, when one wants to define a new XML view from an existing composed view.

A. The View Query: RXL

Next, RXL (Relational to XML transformation Language) is described. RXL essentially combines the extraction part of SQL, i.e., a from and a where clause (possibly followed by sort by and/or group by clauses) with the construction part of XML-QL, i.e., the construct clause.

As a first example, consider this RXL query, which defines a fragment of an XML view:

from Clothing $c
   where $c.category="outerwear"
   construct <product>
      <name>$c.item</name>
      <Category>$c.category</category>
      <retail>$c.price</retail>
   </Product>

Given a database like that in the supplier's schema, the query can produce an XML fragment like the following:

<product><name> . . . </name><category> . . . </category><retail>. . . </retail></product>
   <product><name> . . . </name><category> . . . </category><retail> . . . </retail></product>

A root element is missing; later it will be explained how to add one.

As in SQL, the from clause declares variables that iterate over tables. Variable names start with a $. In this example, $c is a tuple variable that iterates over the Clothing table. The where clause contains zero or more filters (Boolean predicates) over column expressions. The column expression $c.item refers to the item attribute value of $c and in this case, requires that it equal the string "outerwear". The construct clause specifies the XML value, called an XML template, in terms of the bound column expressions.

RXL has three powerful features that make it possible to create arbitrarily complex XML structures: nested queries, Skolem functions, and block structure. An example of a nested query is:

```
construct <view> {
    from Clothing $c
    construct <product>
            <name>$c.item</name>
            { from Problems $p
                where $p.pid = $c.cid
                construct <report>$p.comments</report>
            }
        </product>
} </view>
```

The outer query has no from or where clauses, only a <construct> clause for the root element <view>. The first sub-query builds one <product> element for each row in Clothing. Its inner sub-query creates zero or more <report> sub-elements, one for each report associated with that product. Those skilled in the art and familiar with SQL will recognize this as a left-outer join of Clothing with Problems followed by a group by on Clothing.

Skolem functions allow the way elements are grouped to be controlled. Recall that in XML an attribute with type ID contains a value that uniquely identifies the element in the document, i.e., a key. In RXL, the distinguished attribute ID always has type ID, and its value is a Skolem term, which is used to control grouping and element creation. For example, in the following:

from Clothing $c
   construct<category ID=Cat($c.category) name=$c.category>
      <product>$c.item</product>
   </category>

Cat is a Skolem function and Cat ($c.category) is a Skolem term whose meaning is that only one <category>element exists for every value of $c.category, and it includes all products in that category:

<category><product>p1</product><product>p2</product></category>
   <category><product>p3</product><product>p4</product></category>
. . .

Without the ID. attribute and its Skolem term, the query would create one <category> element for each row in Clothing:

<category><product>p1</product></category>

<category><product>p2</product></category> . . .

When Skolem terms are missing, RXL introduces them automatically. Since Skolem terms could be used to define arbitrary graphs, RXL enforces semantic constraints that guarantee a view always defines a tree, and therefore, a well-formed XML document. For example, the Skolem term of a sub-element must include all the variables of its the parent element.

Finally, the block structure allows RXL to construct parts of complex elements independently. The query below shows an illustrative multi-block RXL view query containing two blocks.

```
construct
    <view ID=View( )>
        {from Clothing $c
        construct<product ID=Prod($c.item)>
            <name ID=Name($c.item)>$c.item</name>
            <Price ID=Price($c.item, $c.price)>$c.price</price>
        </product>}
        {from Clearance $d
        where $d.disc >50,
        construct <product ID=Prod($d.prodname)>
            <name ID=Name($d.prodname)>$d.prodname</name>
            <discount ID=Discount($d.prodname, $d.disc)>$d.disc</discount>
        </Product>
    </view>
```

The first block creates elements of the form:

<product><name>n</name><price>p</price></product> for each product name in Clothing. The second block creates elements of the form:

<product><name>n</name><discount>d</discount></product> for each product name in Clearance. It is to be assumed that Clearance(*prodname, disc) is part of the supplier's schema. When the same product name occurs both in Clothing and Clearance, then the two elements will have the same ID key and can be merged into:

<p r o d u c t > < n a m e > n < / n a m e > < p r i c e > p < / price><discount>d</discount></product>

Those skilled in the art and familiar with SQL will recognize this as an outer join.

The below code contains the complete view query, RXL view query (V), for the supplier relational schema example described above.

```
1.  construct
2.  <supplier ID=Supp( )>
3.      <company ID=Comp ( )>"Acme Clothing"</company>
4.      {
5.      from Clothing $c
6.      where $c.category = "outerwear"
7.      construct
8.          <product ID=Prod($c.pid)>
9.              <name ID=Name($c.pid,$c.item)>$c.item</name>
10.             <category ID=
                    Cat($c.pid,$c.category)>$c.category</category>
11.             <descriptionID=
                    Desc($c.pid,$c.description)>$c.description</description>
12.             <retail ID=Retail($c.pid,$c.price)>$c.price</retail>
13.             { from SalePrice $s
14.             where $s.pid = $c.pid
15.             construct
16.                 <sale ID=Sale($c.pid,$s.pid,$s.price)>$s.price</retail>
17.             }
18.             { from Problems $p
19.             where $p.pid = $c.pid
20.             construct
21.                 <report code=$p.code ID=
                        Prob($c.pid,$p.pid,$p.code,$p.comments)>
22.                     $p.comments
23.                 </report>
24.             }
25.         </product>
26.     }
27. </supplier>
```

Lines 1, 2, and 26 create the root <supplier> element. Notice that the Skolem term Supp( ) as no variables, meaning that one <supplier> element is created. The outermost clause constructs the top-level element supplier and its company child element. The first nested clause (lines 4–26) contains the query fragment described above, which constructs one product element for each "outerwear" item. Within this clause, the nested clause (lines 13–17) expresses a join between the Clothing and Sale Price tables and constructs a sale element with the product's sale price nested within the outer product element. The last nested clause (lines 18–24) expresses a join between the Clothing and Problem tables and constructs one report element containing the problem code and customer's comments; the report elements are also nested within the outer product element. Notice that the Skolem term of product guarantees that all product elements with the same identifier are grouped together. Usually Skolem terms can be inferred automatically, but they have been included explicitly, because they are relevant to query composition described herein.

B. The User Query: XML-QL

Applications do not access the relational data directly, but through the XML view. To do so, applications provide user queries in XML-QL, a query language specifically designed for XML. XML-QL queries contain a where clause followed by a construct clause. The where clause contains an arbitrary number of XML patterns and filters. The construct clause is identical to that in RXL.

In the example described herein, the reseller can retrieve all products with a sale price less than half of the retail price using the XML-QL user query (U) below:

```
1.  construct
2.   {
3.      where <supplier>
4.          <company>$company</company>
5.          <product>
6.              <name>$name</name>
7.              <retail>$retail</retail>
8.              <sale>$sale</sale>
9.          </product>
10.     </supplier> in "http://acme.com/products.xml",
11.     $sale < 0.5 * $retail
12. construct
13.     <result ID=Result($company)>
14.         <supplier>$company</supplier>
15.         <name>$name</name>
16.     </result>
17. } 
```

The where clause includes a pattern (lines 3–10) and a filter (line 11). A pattern's syntax is similar to that of XML data, but also may contain variables, whose names start with $. Filters are similar to RXL (and SQL). The meaning of a query is as follows. First, all variables in the where clause are bound in all possible ways to the contents of elements in the XML document. For each such binding, the construct clause constructs an XML value. Grouping is expressed by Skolem terms in the construct clause. In this example, the construct clause produces one result element for each value of $company. Each result element contains the supplier's name and a list of name elements containing the product names.

In this example, the answer to the user query includes a small fraction of the relational database, i.e., only those products that are heavily discounted.

C. The Query Composer

The query composer module 102, of SilkRoute 100, takes a user query and the RXL view query and generates a new RXL query, which is equivalent to the user query evaluated on the materialized view. In the example described herein, the view query is the RXL view query (V) above, the user query is the XML-QL user query (U), and the composed query, RXL query (C) is shown below.

```
construct

{ from Clothing $c, SalePrice $s
    where $c.category = "outerwear",
        $c.pid = $s.pid,
        $s.price < 0.5 * $c.retail
    construct
        <result ID=Result("Acme Clothing")>
        <supplier>"Acme Clothing"</supplier>
        <name ID=Name($c.pid, $c.item)>$c.item</name>
        </result>
}

```

The composed query combines fragments of the view query and user query. Those fragments from the user query are highlighted. The composed query extracts data from the relational database in the same way as the view query. It also includes the user filter $s.price<0.5$c.retail and structures the result as in the user query. The details of the composition are subtle, and a complete description of the composition algorithm is described later herein.

The composed query is referred to as executable, because it is typically translated into SQL queries and sent to the relational database engine. The answer of the executable query is quite small—the same as that of the user query. In general, it is more efficient to execute the composed query, instead of materializing the view query, because composed queries often contain constraints on scalar values that can be evaluated using indexes in the relational database. Such indices are of little or no use when evaluating a view query. For example, consider a user query that specifies the condition: $s.price between 80 and 100. This condition is propagated into the executable query, and then into the SQL query, and can be evaluated efficiently if an index exists on price. In contrast, an index on price is useless when materializing the view query directly.

D. Translator and XML Generator

The translator 104, takes an RXL query and decomposes it into one or more SQL queries and an XML template. The SQL queries are executed by the RDBMS 110, server or engine, and their flat results (streams of tuples) are converted into XML by the XML generator 106.

The translator 104, also takes a source description, which is an XML document specifying systems information needed to contact the source: the protocol (e.g. JDBC), the connection string, and a source-specific query driver. The driver translates RXL expressions into the source's query language, which is typically a dialect of SQL. Although one skilled in the art will appreciate that other query languages can be supported. For example, the executable RXL query (C) is translated into the following SQL query:

```
select c.pid as pid, c.item as item
from Clothing c, SalePrice s
where c.category="outerwear",
    c.pid=s.pid,
    s.price<0.5*c.retail
sort by c.pid
``` and into the XML template:

```

<result ID=Result("Acme Clothing")>
        <supplier>"Acme Clothing"</supplier>
        <name ID=Name($pid, $item)>$item</name>
    </result>

``` where the variables $pid and $item refer to the attributes pid and item in the SQL query's select clause; the template generation is described in more detail in section II, part A below. After translation, the SQL query is sent to the relational engine, RDBMS 110, and the resulting tuple stream is fed into the XML generator 106, which produces the XML output.

In this example, the translation requires only one SQL query. In general, there may be several ways to translate a complex RXL query into one or more SQL queries and to merge tuple streams into the XML result. Choosing an efficient evaluation strategy may be important when the RXL query returns a large result, e.g., if the entire XML view is materialized. SilkRoute can have one or more evaluation strategies, which can generate one SQL query for each disjunct of an RXL sub-query, which must be in disjunctive-normal form (DNF). Each SQL query has a sort by clause, making it possible for the XML generator 106, to merg the queries into an XML document in a single pass.

5. Alternative Approaches

The above example of the present invention has been described in terms of a general approach for exporting relational data into XML. Other approaches are possible, and in some cases, may be more desirable.

Currently, the most widely used Web interfaces to relational databases are HTML forms with CGI scripts. A script can translate user inputs into SQL queries, and the query answers can be rendered in HTML. The answers could be generated just as easily in XML. Forms interfaces may be appropriate for casual users, but may not be appropriate for data exchange between applications, because they limit the application to only those queries that are predetermined by the form interface. Aggregate queries, for example, are rarely offered by form interfaces.

In another alternative implementation of the invention, the data provider can either pre-compute the materialized view or compute the view on demand whenever requested by an application. This alternative can be feasible when the XML view is small and the application needs to load the entire XML view in memory, e.g., using the DOM (document object module defined by the World Wide Web Consortium DOM Recommendation) interface. However, pre-computed views are not dynamic (i.e., their data can become stale) and are not acceptable when data freshness is critical.

Another alternative implementation of the present invention uses a native XML database engine, which can store XML data and process queries in some XML query language. XML engines will not replace relational databases, but a high-performance XML engine might be appropriate to use in data exchange. For example, one could materialize an XML view using SilkRoute and store the result in an XML engine running XML-QL, thus avoiding the query composition cost done in SilkRoute. However, XML engines may not match the performance of commercial SQL engines anytime soon. In addition, this approach can suffer from data staleness, and incur a high space cost (e.g., for disk space) because it duplicates the entire data in XML.

II. Query Composition

In this section, the query composition algorithm is described. As discussed previously, an RXL query, such as V, takes a relational database as an input and returns an XML document as an output. The XML-QL user query, such as U, which is written against V, takes an XML document as an input and returns an XML document. For any database D, the result of U can be computed by first materializing V(D), denoted as XMLD, and then computing U(XMLD). The query composition problem is to construct an equivalent RXL query C, where C=U V. In other words, it would be desirable to construct an RXL query C that is guaranteed to yield the same result as U and V for any database D, that is, C(D)=U(V(D)). C takes as an input a relational database and returns an XML document. With C, the construction of the intermediate result XMLD is skipped. As an example, RXL view query (V), and XML-QL user query (U) can be used with the result of the composition, C, being composed RXL query (C).

Before describing the details, a brief intuitive description is given. The key observation is that all XML components (tags, attributes, #PCDATA) present in XMLD are explicitly mentioned in the construct clause(s) of RXL view query (V). When XML-QL user query (U) is evaluated on XMLD, its patterns are matched with these components. The key idea is then to evaluate XML-QL user query (U) on the templates of RXL view query (V) directly, without constructing XMLD. During this evaluation only the patterns are considered and not the filters occurring in user query (U). In this example, user query (U) has a unique pattern that mentions <supplier>, <company>, <product>, <name>, <retail>, and <sale> with a particular nesting, and all these tags also occur in the templates of view query (V) under the same nesting. RXL view query (V) is shown again below, this time after the matching, with the matched tags being bolded.

```
construct
<supplier ID=Supp()>
    <company ID=Comp()>"Acme Clothing"</company>
    {
      from Clothing $c
      where $c.category = "outerwear"
      construct
        <product ID=Prod($c.pid)>
        <name ID=Name($c.pid,$c.item)>$c.item</name>
        <category ID=Cat($c.pid,$c.category)>$c.category</category>
        <retail ID=Retail($c.pid,$c.price)>$c.price</retail>
          { from SalePrice $s
            where $s.pid = $c.pid
            construct
              <sale ID=Sale($c.pid,$s.pid,$s.price)>$s.price</sale>
          }
          { from Problems $p
            where $p.pid = $c.pid
            construct
              <report code=$p.code
```

-continued

```
              ID=Prob($c.pid,$p.pid,$p.code,$p.comments)>
                $p.comments
              </report>
          }
        </product>
    }
</supplier>
```

That is, the RXL view query (V) is shown with patterns from the XML-QL user query (U) highlighted. Once the matching is done, the composed query (C) can be constructed in a second step, as follows. The construct clause of the composed query (C) is the same as the construct clause of the XML-QL user query (U), modulo variable renaming. The from and where clauses of the composed query (C) include both of the "relevant" from and where clauses in the view query (V) and all the where filter conditions in the user query (U), modulo variable renaming. This completes the construction of composed query (C). In this example, the "relevant" from and where clauses are:

from Clothing $c, SalePrice $s where $c.category="outerwear", $s.pid=$c.pid and the where filter condition in user query (U) is $sale<0.5*$retail which becomes the following after variable renaming:

where $s.price<0.5*$c.retail

Inspection of the composed RXL query (C) shown above indicated that the from and where clauses, together, form the from and where clauses of the composed query (C).

Figure 2:
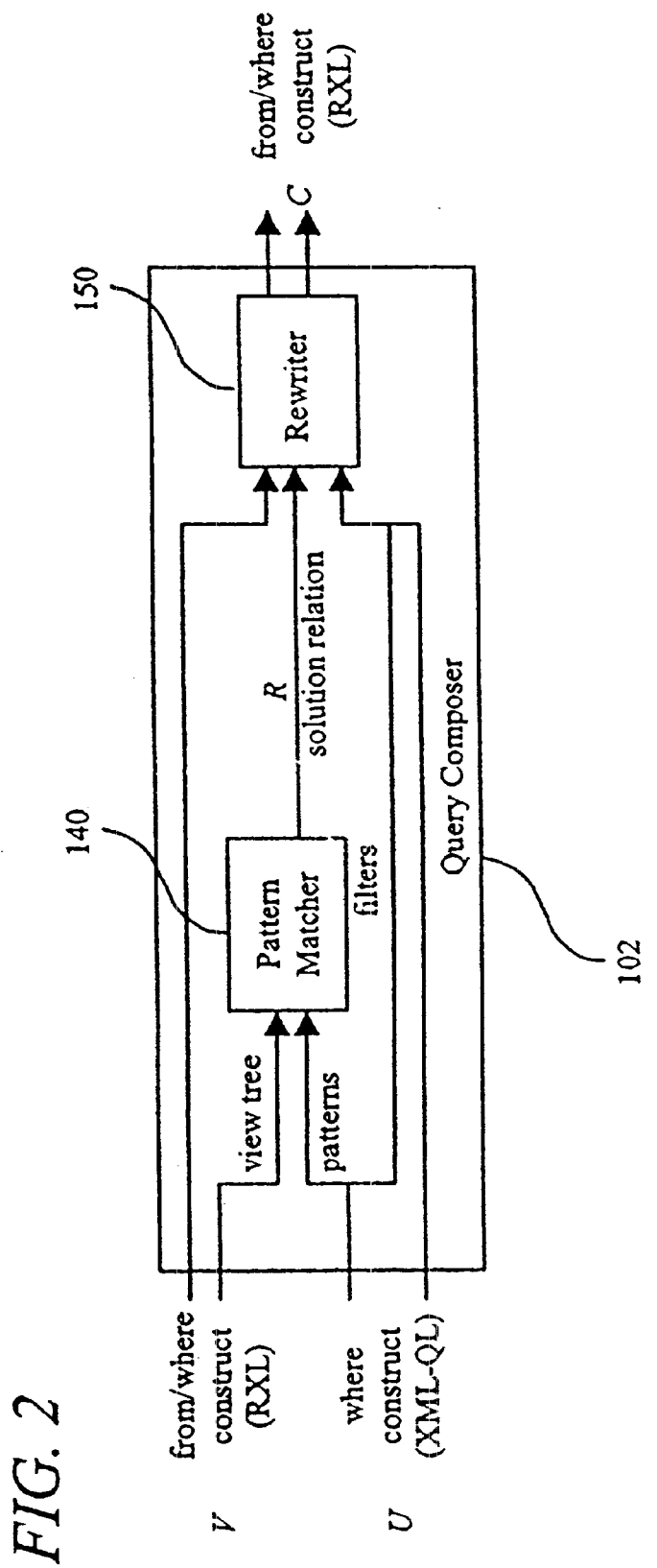
FIG. 2 depicts an illustrative architecture of query composition according to the present invention.

FIG. 2 depicts the architecture of query composition according to the present invention. The pattern matcher 140, implements a first step, which involves evaluating user queries (U) on view query (V) templates. During the first step, the user query (U) patterns are matched with view query (V) templates. The result is a solutions relation, R, in which each tuple represents one match. Multiple matches may occur if the patterns contain alternation, e.g., <company|organization>, or Kleene-star operators, e.g., <*.supplier>, or tag variables <$elm>. A rewriter 150, carriers out a second step by taking the remaining clauses (the from and where of the view query (V) and the construct of the user query (U)) and the relation R, and rewriting each solution tuple into one RXL clause. The result is the composed query C.

The illustrative query composition technique can be viewed as an example of partial evaluation, where the patterns are evaluated at composition time (a.k.a. compile time) on view query (V) templates, and the filters and constructors are evaluated at run time when the new RXL view is evaluated. Section II, parts A–D of the description describe the internal representation of view and user queries and provide a detailed description of an illustrative composition algorithm according to the present invention. A pseudo code version of the algorithm appears in section III.

A. Step 1: Pattern Matching

In Step 1, the solutions relation R that contains all matchings of user query (U) patterns with view query (V) templates can be constructed.

1. Construct the View Tree.

For the composition algorithm, the view query V may be represented by a data structure called a view tree, which includes a global template and a set of datalog rules. The global template can be obtained by merging all view query (V) templates from all its construct clauses. Nodes from two different templates may be merged if and only if they have the same Skolem function. Hence, each Skolem function occurs exactly once in the view tree. The datalog rules are non-recursive. Their heads are the Skolem functions names, and their bodies include relation names and filters. The datalog rules can be constructed as follows. For each occurrence of a Skolem function F in a view query (V), one rule is constructed of the form F(x, y, . . . ):-body, where body is the conjunction of all from and where clauses in the scope where F occurs. When a rule is associated with a Skolem function, then that rule guards the Skolem function and its corresponding XML element. In both the template and datalog rules, the tuple variables used in RXL can be replaced by column variables.

Below is the template of the view tree for the RXL query on the left and the datalog rules of the view tree for the RXL query on the right according to the illustrative example of the present invention described herein.

can be introduced, with one variable for the ID attribute of each element in the pattern. In this example, U has a single pattern and six new variables are added, one temporary variable for each element in the pattern, as shown below.

<supplier ID=$t1>
        <company ID=$t2>$company</company>
            <product ID=$t3>
                <name ID=$t4>$name</name>
                <retail ID=$t5>$retail</retail>
                <sale ID=$t6>$sale</sale>
            </product>
    </supplier>

The necessity of these variables and how to handle multi-block user queries are described in section II, part A(3) below.

---

```
<supplier ID=Supp( )>                              Supp( )  :–    true
    <company ID=Comp( )>Acme Clothing</company>    Comp( )  :–    true
    <product ID=Prod($cpid)>                       Prod($cpid) :–  Clothing($cpid, _, $category, _, _),
                                                                   $category = "outerwear"
        <name ID=Name($cpid,$citem)>               Name($cpid, $citem) :–  Clothing($cpid, $citem, $category, _, _),
            $citem                                                         $category = "outerwear"
        </name>
        <category ID=Cat($cpid,$ccategory)>        Cat($cpid, $ccategory) :–  Clothing($cpid, _, $category, _, _),
            $ccategory                                                       $category = "outerwear"
        </category>
        <retail ID=Retail($cpid,$cprice)>          Retail($cpid, $cprice) :–  Clothing($cpid, _, $category, _, $cprice),
            $cprice                                                           $category = "outerwear"
        </retail>
        <sale ID=Sale($cpid,$spid,$sprice)>        Sale($cpid, $spid, $sprice) :–
            $sprice                                    Clothing($cpid, _, $category, _, _), $category = "outerwear",
        <sale>                                         SalePrice($spid, $sprice), $cpid = $spid
        <report ID=Rep($cpid,$ppid,$pcode,$pcmnts) Rep($cpid, $ppid, $pcode, $pcmnts) :–
            code=$Pcode>                               Clothing($cpid, _, $category, _, _), $category = "outerwear",
                $pcmnts                                Problems($ppid, $pcode, $pcmnts), $cpid = $ppid
            </report>
    </product>
</supplier>
```

---

The unique supplier element is guarded by the rule Supp( ):-true, which is always true, because no predicate expression guards the element's creation. The retail elements are guarded by the rule:

Retail($cpid, $cprice):-Clothing($cpid_, $category_, $cprice), $category="outerwear"

which means that one retail element is created for each value of cpid and cprice that satisfies the table expression on the right-hand side. There is only one datalog rule for each Skolem function, because each function occurs once in the query view (V).

2. Evaluate User View (U) on the View Tree.

Next, the patterns of user view (U) can be matched with the template of view query (V).

To simplify presentation, it is assumed that the user view (U) includes a single block as represented by Equation 1:

$$U=\text{construct} <\text{elm}> \{\text{where } P, W \text{ construct } T\} </\text{elm}> \quad (1)$$

where T denotes the template, P denotes all patterns, and W denotes all filters. New, temporary variables in U's patterns Next, U's patterns on V's template are evaluated in the standard way of evaluating patterns on a tree. In general, there may be zero, one, or more results. The results can be represented as a table R, with one column for each variable in U, and one row for each result. The values in the table are #PCDATA, Skolem terms, variables, tag names, attribute values, and attribute names, which occur in V's template. In this example, the step results in the following table R:

| $t1 | $t2 | $company | $t3 | $t4 | $name | $t5 | $retail | $t6 | $sale |
|-----|-----|----------|-----|-----|-------|-----|---------|-----|-------|
| Supp( ) | Comp( ) | Acme Clothing | Prod($cpid) | Name($cpid, $cprice) | $citem | Retail($cpid, $cprice) | $cprice | Sale($cpid, $spid, $sprice) | $sprice |

The column names correspond to the variables in U's single pattern shown above. The single row in R means that there exists only one matching of U's pattern with V's template. The row specifies that U's variable $name is bound to $citem in V, the variable $t3 is bound to the Skolem term Prod($cpid), and the variable $company is bound to the #PCDATA Acme Clothing.

B. Step 2: Query Rewriting

In Step 2, the table R can be used to construct the composed query C. Each row in R represents one match, and composed query C is the union of all possible matches. In particular, composed query C includes several parallel blocks, which denote a union in RXL. In each block, the from and where clauses contain the "relevant" datalog rules, that is the rules for the Skolem functions in the corresponding row. The construct clause of the block contains the template of the user view U. Recall that U includes a single block (Eq. 1), and that T denotes its template, P its patterns, and W its filters. Let the rows in R be $r_1 \ldots r_k$. Then C includes several parallel blocks:

C=construct{<elm>{$B_1$} ... {$B_k$} </elm>} with one or more blocks corresponding to each row $r_i$. In the next section, how blocks corresponding to one row, $r_i$, in R are constructed is described.

1. Construct One Block

To construct the from and where clauses of one block, the clauses are represented as one datalog rule. Then, the rule is converted into a from-where clause. Let $F_1 \ldots F_n$, be the Skolem functions that occur in the row $r_i$. Recall that the view tree associates one or more datalog rules to each Skolem function. Assume that there is a unique datalog rule for each Skolem function:

$F_1$:-body$_1$ ... $F_n$:-body$_n$.

The block's construct clause is $S_0(T)$ where $S_0$ is a variable substitution defined below. For each datalog rule $F_i$, one variable substitution $S_i$ is applied. The body of the new temporary variables $t1 ... $t2. The new row is $S_0$, which maps U's variables to variables, constants, and Skolem terms.

When there is more than one datalog rule per Skolem function, the resulting datalog program is converted into disjunctive normal form, i.e., a disjunction of multiple conjunctive datalog rules, before generating the RXL blocks. For each conjunctive rule, the construction above can be applied to obtain one block and take the union of all such blocks. In this case, more than one block for one row $r_i$ can be obtained.

In this example, table R has one row that contains the Skolem terms Supp( ), Comp( ), Prod($cpid), Name($cpid, $citem), Retail($cpid, $cprice), and Sale($cpid, $spid, $sprice). Their corresponding datalog rules are shown in the view tree for the RXL query in section 11, part A(1) above. Next, the substitutions $S_1, \ldots, S_6$ are computed such that the rules have disjoint variables with the exception of variables that have parent/child relationships. In this example, the variable $t3 is the parent of variables $t4, $t5, $t6; see the pattern in section II, part A(2) above. Therefore the Skolem term Prod($cpid) shares the variable $cpid with that in Name ($cpid, $citem), Retail ($cpid, $cprice), and Sale ($cpid, $spid, $sprice). Otherwise, all variables must be distinct. The modified rules are:

| Supp( ) | :- | true |
| Comp( ) | :- | true |
| Prod($cpid) | :- | Clothing($cpid, _, $category1, _, _), $category1 = "outerwear" |
| Name($cpid, $citem) | :- | Clothing($cpid, $citem, $category2, _, _), $category2 = "outerwear" |
| Retail($cpid, $cprice) | :- | Clothing($cpid, _, $category3, _, $cprice), $category3 = "outerwear" |
| Sale($cpid, $spid, $sprice) | :- | Clothing($cpid, _, $category4, _, _) $category4 = "outerwear", SalePrice($spid, $sprice), $cpid = $spid | datalog rule is the union of all bodies after variable substitution, plus $S_0(W)$. Thus, the new rule has the form:

$Q(S_0(x), S_0(y), \ldots)$:-$S_0(W), S_1(body_1), \ldots S_n(body_n)$ where x, y, ... are the variables in U's template T. Next, Q is minimized, and rewritten as a from-where clause: all relation names appearing in the from clause, and all filters appearing in the where clause. This completes the construction of one block.

2. Variable Substitutions

Next, the substitutions of $S_0$ and $S_1 \ldots S_n$ are defined. For all the datalog rules $F_1, \ldots F_n$, the substitutions $S_1 \ldots S_n$ are constructed so that the expressions $S_1(body_1) \ldots S_n(body_n)$ all have distinct variables, with one exception. For every two columns $t_j$, $t_k$ in R, where the variable $t_j$ corresponds to an element that is the parent of $t_k$'s element, all variables in $S_j(F_j(\ldots))$ can be shared with $S_k(F_k(\ldots))$.

To compute $S_0$, the substitutions $S_1 \ldots S_n$ are applied to the entire row $r_i$ and drop all columns in $r_i$ that correspond to the The substitution $S_0$ is obtained directly from the table R, by dropping all columns corresponding to the new variables $t1, \ldots, $t6:

| $S_0$ = | | | |
| --- | --- | --- | --- |
| $company | $name | $retail | $sale |
| Acme Clothing | $citem | $cprice | $price |

The template T of U is in the user query shown in section 1, part B. The filter W of U is $sale <0.5* $retail. Only the variables $company and $name occur in T, so $S_0$($company) and $S_0$($name) need to be included in the rule's head; $company, however, is a constant, therefore the rule becomes:

| Q($citem) :- | Clothing($cpid, _, $category1, _, _), $category1 = "outerwear", |
| | Clothing($cpid, $citem, $category2, _, _), $category2 = "outerwear", |
| | Clothing($cpid, _, $category3, _, $cprice), $category3 = "outerwear", |
| | Clothing($cpid, _, $category4, _, _), $category4 = "outerwear", SalePrice($spid, $sprice), $cpid = $spid, |
| | $sprice < 0.5 * cprice |

The last line is $S_0(W)$. Minimizing Q, the following equivalent query is obtained:

```
Q($citem) :- Clothing($cpid, _, $category3, _, $cprice), $category3 = "outerwear",
             SalePrice($spid, $sprice), $cpid = $spid,
             $sprice < 0.5 * cprice
```

Finally, the rule can be converted into from and where clauses, and a construct clause can be added whose template is $S_0(T)$:

```
from       Clothing($cpid, _, $category3, _, $cprice),
           SalePrice($spid, $sprice)
where      $category3 = "outerwear",
           $cpid = $spid, $sprice < 0.5 * cprice
construct  <result ID= Result("Acme Clothing")>
              <supplier> Acme Clothing </supplier>
              <name> $citem </name>
           </result>
```

Lastly, column variables are replaced by tuple variables, and the single-block query C shown in section I, part C can be obtained.

C. Other Exemplary Implementations

The above-described exemplary implementation of the present invention illustrates a simple example of query composition. Below, several other exemplary implementations of the present invention that illustrate more complex cases are described.

1. View Tree for Multi-block Query

Consider the two block RXL query in section I, part A. Below, on the left side is the view tree template for the two block query and on the right side is the datalog for the two block query.

```
<view ID=View( )>                            View( )           :- true
   <product ID=Prod($name)>                  Prod($name)       :- Clothing($name, _)
                                             Prod($name)       :- Clearance($name, $ddisc), $ddisc > 50
      <name ID=Name($name)>                  Name($name)       :- Clothing($name, _)
         $name                               Name($name)       :- Clearance($name, $ddisc), $ddisc > 50
      </name>
      <Price ID=Price($name, $cprice)>       Price($name,$cprice)  :- Clothing($name, $cprice)
         $cprice
      </price>
      <discount ID=Discount($name, $ddisc)>  Discount($name, $ddisc) :- Clearance($name, $ddisc),
         $ddisc                                                         $ddisc > 50
      </discount>
   </product>
</view>
```

In the RXL query, the Skolem functions Prod and Name occur twice. In the view tree, each function has two corresponding datalog rules, but in the template, they occur once.

2. Multiple Rows

In general, R may contain multiple rows. To illustrate R with multiple rows, the query V described and shown in section II, part A(1) is employed. R is composed with the following XML-QL user query U':

```
construct  {
   where <supplier.product.(retail | sale)>$val</> in
      "http://acme.com/products.xml"
   construct <price>$val</price>
} 
```

The regular expression supplier.product.(retail|sale) matches a retail or a sale element nested within a supplier and a product element. It is analogous to the XPath expression /supplier/product /retail|sale. There are two matches of U with V, which produce two rows in R:

| $t1    | $t2         | $t3                          | $val     |
|--------|-------------|------------------------------|----------|
| Supp() | Prod($cpid) | Retail($cpid, $cprice)       | $cprice  |
| Supp() | Prod($cpid) | Sale($cpid, $spid, $sprice)  | $sprice  |

The temporary variables $t1, $t2, $t3, are for supplier, product, and retail|price, respectively. The composed query C has two blocks:

C=construct {B1}{B2}

The relevant datalog rules for the first row are those for Supp, Prod and Retail of view query described in section II, part A(1). No variables are renamed, because $t2 is the parent of $t3. The generated datalog rule after minimization is:

Q($cprice):-Clothing($cpid,_, $category,_,$cprice),
         $category="outerwear"
and it produces C's first block BI:
   B1=from Clothing $c
      where $ c.category="outerwear"
      construct <price>$c.price</price>

The relevant datalog rules for the second row are those for Supp, Prod, and Sale. As before, no variables are renamed, and the datalog rule is:

Q($cprice):-Clothing($cpid,_, $category,_, _,
         $category="outerwear", SalePrice($spid, $sprice),
         $cpid=$spid which produces C's second block B2:

B2=from Clothing $c, SalePrice $s
      where $c.category="outerwear", $c.pid=$s.pid
      construct <price>$c.pid</price>

3. Adding Template Variables

The temporary variables $t1, $t2, etc. added to U's patterns play an important role, as revealed by the next example. The query V, written directly with column variables, is:

```
V = construct <v ID=H()>     { from T($x, $y)
                               construct <a ID = F($x)>
                                           <b ID = G($x, $y)> $y </b>
                                         </a>
                             } </V>
``` and the two XML-QL queries U, U' can be considered:

```
U  = construct  {   where <v><a><b>$z1</b><b>$z2</b></a></v>
                             construct <result><z1>$z1</z1><z2>$z2</z2></result>
                         } 
U' = construct  {   where <v><a><b>$z1</b></a><a><b>$z2</b></a></v>
                             construct <result><z1>$z1</z1><z2>$z2<z2></result>
                         } 
```

Both return pairs of <b> values, but the first query returns pairs where both <b>'s are in the same <a> element. Without temporary variables in U's patterns, the relation R would be the same for U and U'. After introducing the new variables, the two relations R have different column names, and as expected, they produce two distinct composed queries.

4. Renaming variables in Datalog Rules

Continuing with the previous example, the need for the substitutions $S_1, S_2, \ldots$ First, V's view tree is constructed:

```
<v    ID=H()>                 H ()           :- true
   <a ID = F($x)>              F($x)         :- T($x, _)
      <b ID = G($x, $y)>$y</b> G($x, $y)     :- T($x, $y)
   </a>
</v>
```

Next, the composition with U' is illustrated. Five temporary variables are added and U's pattern becomes:

```
<v ID=$t1>    <a ID=$t2><b ID=$t3>$z1</b></a>
              <a ID=$t4><b ID=$t5>$z2</b></a>
</v>
```

Matching the pattern with the template produces one row in R:

| $t1 | $t2   | $t3       | $z1 | $t4  | $t5       | $z2 |
|-----|-------|-----------|-----|------|-----------|-----|
| H() | F($x) | G($x, $y) | $y  | F($x)| G($x, $y) | $y  |

Intuitively the variable $y in the $z1 column is different from $y in the $z2, column, because they match different <b> elements, possibly in different <a> elements. This distinction is made precise by the renaming step. Thus, after variable renamings, the five relevant datalog rules become:

```
H()               :- true
F( $x1)           :- T($x1, _)
G($x1, $y1)       :- T($x1, $y1)
F($x2)            :- T($x2, _)
G($x2, $y2)       :- T($x2, $y2)
``` and the composed query C, after query minimization, is:

construct  from T($x1, $y1), T($x2, $y2)
        construct <result><z1>$y1<z1><z2>$y2</z2></result>

5. XML-QL Queries With Block Structure.

In general, U may have several blocks, both nested and parallel. For multi-block user queries, a different table R for each block in U can be constructed, in the same way in which the XML-QL query processor handles multiple blocks. Tables corresponding to parallel blocks are independent; for nested blocks, there is a distinct inner table that corresponds to each row in the outer table. The composed query C follows the same block structure, except that one block in U may generate multiple parallel blocks in C, as described above early in this section.

6. Query Minimization

Query minimization eliminates redundancies in queries, such as duplicate conditions. Query minimization can be expensive, because it is NP-complete. That is, the complexity of query minimization is exponential in the number of variable in the query. Commercial database systems often do not perform minimization, because users typically do not write redundant queries. In SilkRoute, the composed query C can be generated automatically. One condition in a view query V may appear in multiple datalog rules, and, hence be propagated as multiple copies in the generated query C. To avoid query minimization, one could trace these repetitions to the original RXL query, but care is needed to deal with variable renamings. For RXL queries with large parallel blocks, however, query minimization may be unavoidable.

D. Aggregation Queries

Briefly, it is described how aggregations in XML-QL queries can be "pushed " into composed RXL views and evaluated by the target RDBMS according to the present invention. In both XML-QL and RXL, Skolem terms can be used to specify the values by which aggregate expressions are grouped.

Suppose a reseller wants to count the total number of reports for each defective product. This can be expressed in XML-QL as follows:

where <supplier.product ID=$pid>
        <name>$n</>
        <report>$r</>
      </> in "http://acme.com/products.xml"
    construct <product ID=F($pid)>
       <name ID=G($pid, $n)>$n</>
       <totaldefects ID=H($pid)>count(*)</>
    </>

The Skolem term F($pid) in <product ID=F($pid)> asserts that all bindings for the variables $pid, $n and $r are grouped by $pid's value. Similarly, the Skolem term H($pid) specifies the grouping attributes for the aggregate function count (*), which counts the total number of bindings. This idea is similar to the GROUP BY construct in SQL. XML-QL and RXL's semantics guarantee that only one element is produced for each value of a Skolem term, e.g., one name element is emitted for each value of $n.

A simple extension to datalog that accommodates aggregate functions can be used. An example of a datalog rule that can use a "generator" to count values is:

C(p, q, COUNT(*)):-R(p, q)

Only the last argument in the head can be an aggregate function; the other arguments specify the grouping attributes. The meaning is that C contains the set of triples (p, q, r) where r is the number of tuples in the group corresponding to values (p, q) in the relation R.

Using this composition algorithm, the XML-QL query above can be rewritten as:

from Clothing $c, Problems $p
   where $c.pid=$p.pid
   construct <product ID=F($c.pid)>
      <name ID=G($c.pid, $c.item)>$c.item</>
      <totaldefects ID=H($c.pid)>count(*)</>
   </product>

Note that the aggregate function can be "pushed" into the RXL view. When this view is materialized, the aggregation can be evaluated by the relational engine. Significantly, this query can be evaluated efficiently, because commercial database systems are often highly optimized for aggregation queries.

III. A Composition Algorithm-Pseudocode

In the formal description of the algorithm above, a notation for describing the types of values that are manipulated, e.g., view trees, XML-QL blocks, are needed. Types are denoted by grammar rules, such as the following:

| | |
|---|---|
| Node :- | Tag, Rule, [Node] |
| Rule :- | SkolemTerm, [Condition] |
| Condition :- | TableExpr(String,   [Var]) |
| |   Filter(BoolExpr) |
| |   Or([Condition], [Condition]) |

These rules specify that a view tree Node is composed of a tag, a rule, and a list of children nodes. A Rule is composed of a Skolem term (its head) and a conjunctive list of conditions (its body). A Condition is either a table expression, a filter, or the disjunction of two lists of conjuncts.

An XML-QL block is represented by a list of patterns, a list of filters, and a template. An RXL block is represented by a list of conditions and a template:

| | |
|---|---|
| XMLQL :- | [Pattern], [Filter], Template |
| RXL :- | [Condition], Template |

A template is either: a constant string; a variable; an element, which includes a tag and list of nested templates; or a nested query. To simplify presentation, templates are polymorphic, i.e., an XML-QL template contains only a nested XML-QL block and similarly, for an RXL template.

| | |
|---|---|
| Template :- | Const(String) |
| |   Var(String) |

-continued

| | |
|---|---|
| | Element(Tag, [Template]) |
| | NestedQuery(XMLQL) |
| | NestedQuery(RXL) |

Finally, a canonical pattern is represented by the head variable (that occurs on the right-hand side of in), a regular-path expression over strings, and the target variable (that occurs in the body of an element):

Pattern:-Var, RegPathExpr, Var

In this example, each regular-path expression is one string atom, but in general, strings can be combined with the alternation (|), concatenation (.), and Kleene-star (*) operators, similar to those used in regular expressions.

The composition function compose, as shown below, takes two environments, which are lists of (variable, value) pairs. Shown below is an illustrative top-level compose function for a composition algorithm:

```
1.   // Top-level invocation of compose function
2.   X_env = new [("$viewtree", Root( )]
3.   S = new[ ]
4.   R_block_list = compose(X_env , S, X_block)
5.
6.   fun compose(Env X_env, VarMap S, XMLQL X_block)  :[RXL] {
7.      (X_patterns, X_Filters, X_template) = decompose(X_block);
8.
9.      // Get pairs of (parent, child) variables from XML-QL patterns
10.     X_parent_child_vars = getHeadTargetMap(X_patterns);
11.
12.     // Evaluate pattern on view tree
13.     R = evalPattern(X_patterns, X_env);
14.
15.     // Consider each potential solution
16.     R_blocks = new [ ]
17.     for each r_i in R {
18.        // Extend current environment with new variable bindings
19.        X_env' = appendList(X_env, r_i);
20.
21.        // Compute new S variable substitution from X_nodemap
22.        S' = newVariables(X_env1', X_parent_child_vars, S);
23.
24.        //Compute RXL block for potential solution
25.        R_blocks = listAppend(oneSolution(X_env', S', X_block, r_i),
                    R_blocks)
26.     }
27.     return R_blocks
28.  }
```

The initial environment (X_env) maps the distinguished variable $viewtree to the root of the view tree referenced by the query. The initial variable-substitution S that maps XML-QL variables to RXL expressions is empty, and X_block is the top-level XML-QL block (lines 1–3). In this example, $viewtree is bound to the root of the tree defined in the RXL query in section II, part A(1). The result of compose is a list of RXL blocks. In the pseudo-code, XML-QL expressions are prefixed by X_ and RXL expressions by R_

Function compose (line 7) decomposes X block into its patterns, filters, and template, and rewrites each nested pattern in a canonical form as a list of unnested patterns. New temporary variables are introduced to represent the intermediate nodes in the nested pattern.

On line 13, the patterns are evaluated in the current environment, producing R, which maps XML-QL variables to nodes and constants in the view tree. Each tuple in R represents one possible rewriting of the XML-QL query over the view. For each tuple ri the current environment is extended with the new variable bindings (line 19).

Function newVariables (line 22) computes the new mappings of XML-QL and RXL variables to common RXL variables. In summary, newVariables recovers the correspondence between Skolem terms that share a common ancestor in the XML-QL pattern; this correspondence determines the mappings for RXL variables. For XML-QL variables, the mapping is simple. If the corresponding value is a leaf node or constant value, the variable is replaced by its value in the substitution mapping S described in section II, part B. If the corresponding value is an internal node, the variable is replaced by the complete RXL expression that computes that element under the substitution S. Lastly, function oneSolution (line 25) takes the new environment and computes the new RXL blocks, which are appended to the list of other potential solutions.

The composition algorithm for the oneSolution function in the following code constructs the RXL block in three steps.

```
1.   // Return new RXL block for potential solution in r_i
2.   fun oneSolution(Env X_env VarMap S, XMLQL X_block,
        Env r_i) : [RXL] {
3.     R_conditions = new [ ]
4.     // For each XML-QL variable X_v in X_block
5.     foreach X_v in getVariables(X_block) {
6.       // Get view-tree node bound to X_v
7.       R_node = project(r_i, X_v);
8.       // Get rule associated with view-tree node
9.       (R_tag, R_rule R_children) = R_node
10.      // Get body of rule
11.      (R_head, R_body) = R_node;
12.      foreach R_condition in R_body {
13.        R_condition' = makeCopy(R_condition)
14.        // Rename head variables in R_condition' and add to
             R_conditions
15.        R_conditions = cons(rewriteR(S, R_condition'), R_conditions)
16.      }
17.    }
18.    // Rename variables in X_filters and add to R_conditions
19.    foreach X_filter in X_filters
20.      R_conditions = cons(rewriteX(X_env, S, X_filter), R_conditions)
21.
22.    // Put conditions in disjunctive normal form, i.e., [[ Condition ]]
23.    R_disjuncts = to_DNF(R_conditions)
24.
25.    // Rename variables in X_template
26.    R_template = rewriteX(X_env, S, X_template)
27.
28.    R_blocks = [ ]
29.    // Construct new RXL block: solution conditions + RXL template
30.    foreach R_conjunct in R_disjuncts
31.      R_blocks = cons(new RXL(R_conjunct, R_template), R_blocks)
32.
33.    return RXL_blocks
34.  }
```

First, for each XML-QL variable X_v in X_block, it projects Xv's value from the solution tuple r_i. Its value is a view-tree element and an associated rule, whose head and body are projected in R_head and R_body, a list of conditions. Function makeCopy (line 13) assigns fresh variable names to all free variables in R_condition, i.e., those that do not occur in the rule's head. Function rewriteR (line 15) rewrites the new rule, using the variable mapping S. The new condition is added to the conjunctive conditions in R_conditions. Second, the function rewriteX (line 20) rewrites the XML-QL filters in X_filters and adds those to R_conditions. Third, the function to_DNF (line 22) puts the new conditions in disjunctive normal form. On line 23, rewriteX rewrites the XML-QL template to produce the new RXL template. Finally, one new RXL block is created for each list of conjuncts in R_disjuncts, and the union of all these blocks is returned.

The rewriteX and rewriteR functions in the composition algorithm of the rewrite function below 14, replace XML-QL and RXL variables by their new names in S.

```
1.   // rewriteX rewrites XML-QL expression as RXL expression
2.   fun rewriteX(Env X_env, VarMap S, X_Expr E) {
3.     fun substX(E) {
4.       case E of
5.         Var(v)              = lookupMap(S, v)
6.         Const(c)            = new Const(c)
7.         Element(T, X)       = new Element(T, mapList(substX, X))
8.         Relop(op, E1, E2)   = new Relop(op, substX(E1), substX(E2))
9.         // Cases for all types of BoolExprs . . .
10.        // Recursively compose and rewrite nested XML-QL query
11.        NestedQuery(X-block) = new NestedQuery(compose(X_env, S, X_block))
12.      }
13.    return substX(E)
14.  }
15.  // rewriteR renames RXL variables.
16.  fun rewriteR(S varmap, R_Expr E) {
17.    fun substR(E) {
18.      case E of
19.        Var(v)                 = lookupMap(S, v)
20.        TableExpr(name, vars)  = new TableExpr(name, mapList(substR, vars))
21.        Filter(b)              = new Filter(substR(b))
22.        Or(l1, l2)             = new Or(mapList(subst, l1), mapList(substR, l2))
23.        // Cases for all types ofBoolExprs . . .
24.        NestedQuery(RXL(conditions, template)) =
25.          new NestedQuery(new RXL(mapList(substR, conditions), substR template))
26.      }
27.    return substR(E)
29.    }
```

The "helper" functions substX and substR perform the variable substitutions. Note that rewriteX calls compose recursively to rewrite a nested XML-QL block into an equivalent nested RXL block.

IV. Related Systems

IBM's DB2, XML Extender provides a Data Access Definition (DAD) language that supports both composition of relational data in XML and decomposition of XML data into relational tables. DAD's composition feature, like RXL, supports generation of arbitrary XML from relational data. Unlike RXL, the criteria for grouping elements is implicit in the DAD and DAD specifications cannot be nested arbitrarily. More significantly, XML Extender does not support query composition, however, DAD could be used as a view-definition language in a SilkRoute architecture.

V. General Discussion

SilkRoute is a general, dynamic, and efficient framework for viewing and querying relational data in XML. SilkRoute is an XML-export tool that can support arbitrarily complex, virtual views of relational data and support XML user queries over virtual views. The ability to support arbitrary views is critical in data exchange between inter-enterprise applications, which must abide by public DTDs and cannot reveal the underlying schemas of their proprietary data. SilkRoute has many benefits. For example, the fragment of the relational data requested by a user query need only be materialized; that requested data can be produced on demand; and the relational engine can perform most of the computation efficiently.

SilkRoute has one translation strategy, which generates one SQL query for each RXL sub query, which must be in disjunctive-normal form (DNF). In practice, RXL view queries can be arbitrary boolean combinations of table and filter expressions; for example, parallel. RXL blocks often construct parts of complex elements independently, i.e., they express unions. User queries over such views often produce composed queries with many unions. Any RXL sub-query can be normalized into multiple sub-queries in DNF, which can result in a quadratic increase in the number of sub-queries to evaluate. In practice, multiple queries in DNF can be translated directly into SQL, for example, by using SQL's union-join constructs. Similarly, nested RXL queries often express left outer joins, e.g., the parent sub-query is the left relation and the child sub-query is the right relation. Two SQL queries can be generated, one for parent and child, but one SQL query suffices. In addition to reducing the number of SQL queries, each individual RXL sub-query can be minimized, i.e., redundant expressions can be eliminated, so that the resulting SQL query is also, minimal. Techniques exist for query minimization, but general algorithms are NP-complete. Heuristic algorithms are projected to be effective for RXL queries, because RXL's nested block structure can help identify those expressions that most likely are redundant. XML-QL and SilkRoute can be implemented in Java. SilkRoute has drivers for Oracle and MySQL database servers.

What is claimed:

1. A method for converting relational data from a relational database into a structured document comprising the steps of:
   storing a view query that defines a structured document view of the relational database, a structure of the view query being independent of a structure of data in the relational database;
   receiving a user query against the structured document view;
   forming an executable query by determining a composition of the view query and the user query;
   partitioning the executable query into a data extraction portion and a construction portion;
   transmitting the data extraction portion to the relational database;
   receiving at least one tuple stream from the relational database according to the data extraction portion; and
   merging the at least one tuple stream and the construction portion to generate a
   structured document, wherein the structured document view is capable of defining a document of arbitrary nesting depth.

2. The method according to claim 1, wherein the user query is in XML-QL.

3. The method according to claim 2, wherein the view query is a RXL query.

4. The method according to claim 3, wherein the executable query is another RXL query.

5. The method device according to claim 1, wherein said step of receiving the user query includes receiving the user query from an application over a distributed network.

6. The method according to claim 5, wherein the distributed network is a private network.

7. The method according to claim 5, wherein the distributed network is the World Wide Web.

8. The method according to claim 5, further including the step of transmitting the structured document to the application over the distributed network.

9. The method according to claim 1, wherein an answer to the executable query includes a fragment of the relational database.

10. The method according to claim 9, wherein the fragment is one data item or a set of data items.

11. The method according to claim 9, wherein the fragment is an aggregate value.

12. The method according to claim 9, wherein the structured document includes the answer to the executable query.

13. The method according to claim 1, wherein the data extraction portion includes at least one SQL query.

14. The method according to claim 13, wherein the construction portion is an XML template.

15. The method according to claim 13, wherein said step of receiving the at least one tuple stream includes receiving one tuple stream for each SQL-query included in the data extraction portion.

16. The method according to claim 1, wherein said step of forming the executable query includes combining fragments of the user query and the view query.

17. A computer readable medium including a set of executable instructions stored thereon for converting relational data stored in a relational database into structured document data, the set of instructions including:
   forming an executable query from a view query that defines a structured document view of the relational database and a user query, a structure of the view query being independent from a structure of the relational data in the relational database;
   partitioning the executable query into a data extraction portion and a construction portion;
   retrieving at least one tuple stream from the relational database according to the data extraction portion; and
   merging the at least one tuple stream and the construction portion to generate a structured document, wherein the structured document view is capable of defining a document of arbitrary nesting depth.

18. The computer readable medium according to claim 17, further comprising storage for the view query.

19. The computer readable medium according to claim 18, wherein the view query is a RXL query.

20. The computer readable medium according to claim 19, wherein the executable query is another RXL query.

21. The computer readable medium according to claim 17, wherein an answer to the executable query includes a fragment of the relational database.

22. The computer readable medium according to claim 21, wherein the fragment is one data item or a set of data items.

23. The computer readable medium according to claim 21, wherein the fragment is an aggregate value.

24. The computer readable medium according to claim 21, wherein the structured document includes the answer to the executable query.

25. The computer readable medium according to claim 17, wherein the data extraction portion includes at least one SQL query.

26. The computer readable medium according to claim 25, wherein said step of retrieving the at least one tuple stream includes retrieving one tuple stream for each SQL-query included in the data extraction portion.

27. The computer readable medium according to claim 17, wherein said instruction of forming the executable query includes combining fragments of the user query and the view query.

28. A computer system for converting relational data in a relational database into structured document data, said system comprising:

a query composer module configured to form an executable query from a view query that defines a structured document view of the relational data and a user query, the view query having a structure that is independent of a structure of the relational data in the relational database;

a translator module coupled to the query composer module configured to receive the executable query, partition the executable query into a data extraction portion and an construction portion, and transmit the data extraction portion to a relational database;

a generator module configured to receive the construction portion from said translator module, receive at least one tuple stream from the relational database based on data extraction portion, and merge the at least one tuple stream and the construction portion to generate a structured document, wherein the structured document view is capable of defining a document of arbitrary nesting depth.

29. The computer system according to claim 28, wherein said translator module receives a description of a schema of the relational data prior to partitioning the executable query.

30. The computer system according to claim 28, wherein the user query is in XML-QL, the view query is a RXL query and the executable query is another RXL query.

31. The computer system according to claim 28, wherein said query composer module is configured to receive the user query from an application over a distributed network.

32. The computer system according to claim 31, wherein said generator module is configured to transmit the structured document to the application over the distributed network.

33. The computer system according to claim 28, wherein an answer to the executable query includes a fragment of the relational database.

34. The computer system according to claim 33, wherein the fragment is one data item, a set of data items or an aggregate value.

35. The computer system according to claim 33, wherein the structured document includes the answer to the executable query.

36. The computer system according to claim 28, wherein the data extraction portion includes at least one SQL query.

37. The computer system according to claim 36, wherein said generator module receives one tuple stream for each SQL-query included in the data extraction portion.

38. The computer system according to claim 28, wherein said query composer module combines fragments of the user query and the view query to form the executable query.

39. The computer system according to claim 28, wherein the data extraction portion is executable by the relational database.

40. The computer system according to claim 28, where in the query composer module includes a pattern matcher module configured to match patterns of the user query and the view query to obtain a solutions relation, in which each tuple represents a match; and a rewriter module configured to rewrite each tuple.

41. A method of forming a composed query for use in converting relational data of a relational database into XML data, said method comprising the steps of:

receiving a user query in an XML based language requesting relational data;

forming a view query in a transformation language, the view query defining a structured document view of the relational data and having a structure that is independent from a structure of the relational data of the relational database; and composing an executable query in the transformation language from the view query and the user query, wherein the structured document view is capable of defining a document of arbitrary nesting depth.

42. The method according to claim 41, wherein the transformation language is RXL.

43. The method according to claim 41, wherein said step of composing includes the steps of:

matching patterns of the user query and the view query to obtain a solutions relation, in which each tuple represents a match; and rewriting each tuple into a clause in the transformation language.

44. The method according to claim 43, wherein said step, of matching patterns includes the steps of:

constructing a view tree from the view query; and evaluating the user query on the view tree.

45. The method according to claim 43, wherein said step of rewriting includes the step of constructing at least one block using from and where clause of the view query and a construct clause of the user query.

46. The method according to claim 43, wherein said step of rewriting each tuple into a clause in the transformation language is conducted on the basis of from/where clauses of the view query, the solutions relation, and construct clauses of the user query.

47. The method according to claim 1, wherein a format of the structured document is XML.

48. The computer readable medium according to claim 17, wherein a format of the structured document is XML.

49. The computer system according to claim 28, wherein a format of the structured document generated by the generator module is XML.

* * * * *

UNITED STATES PATENT AND TRADEMARK OFFICE
CERTIFICATE OF CORRECTION

PATENT NO. : 6,604,100 B1
DATED : August 5, 2003
INVENTOR(S) : Maria F. Fernandez et al.

It is certified that error appears in the above-identified patent and that said Letters Patent is hereby corrected as shown below:

<u>Title page,</u>
Item [57], ABSTRACT,
Lines 1-2, "(Extensible Markup Language)" has been replaced by -- (eXtensible Markup Language) --

<u>Column 28,</u>
Line 46, "...wherein said step, of matching patterns..." has been replaced with
-- ...wherein said step of matching patterns... --

Signed and Sealed this

Twenty-fifth Day of November, 2003

JAMES E. ROGAN
*Director of the United States Patent and Trademark Office*